Figure 1:
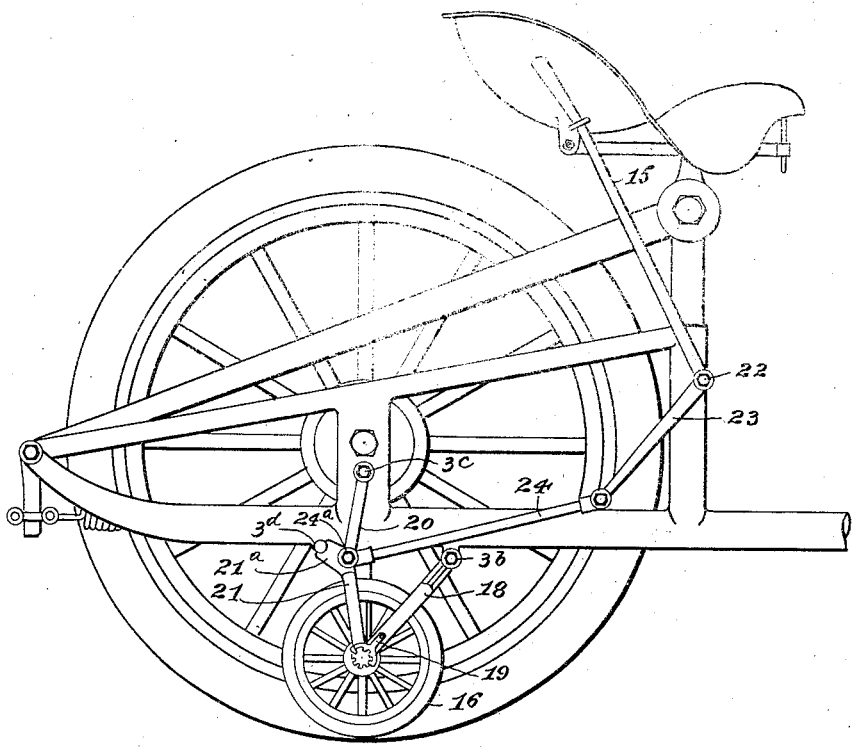

D. J. JOHNSTON.
AUXILIARY WHEEL MECHANISM FOR MOTOR CYCLES.
APPLICATION FILED JAN. 29, 1913.

1,091,065.

Patented Mar. 24, 1914.

2 SHEETS—SHEET 1.

Witnesses:
C. B. Smith
L. G. Hopper

Inventor
David J. Johnston
by Louis F. Griswold
his Attorney

D. J. JOHNSTON.
AUXILIARY WHEEL MECHANISM FOR MOTOR CYCLES.
APPLICATION FILED JAN. 29, 1913.
1,091,065.
Patented Mar. 24, 1914.
2 SHEETS—SHEET 2.
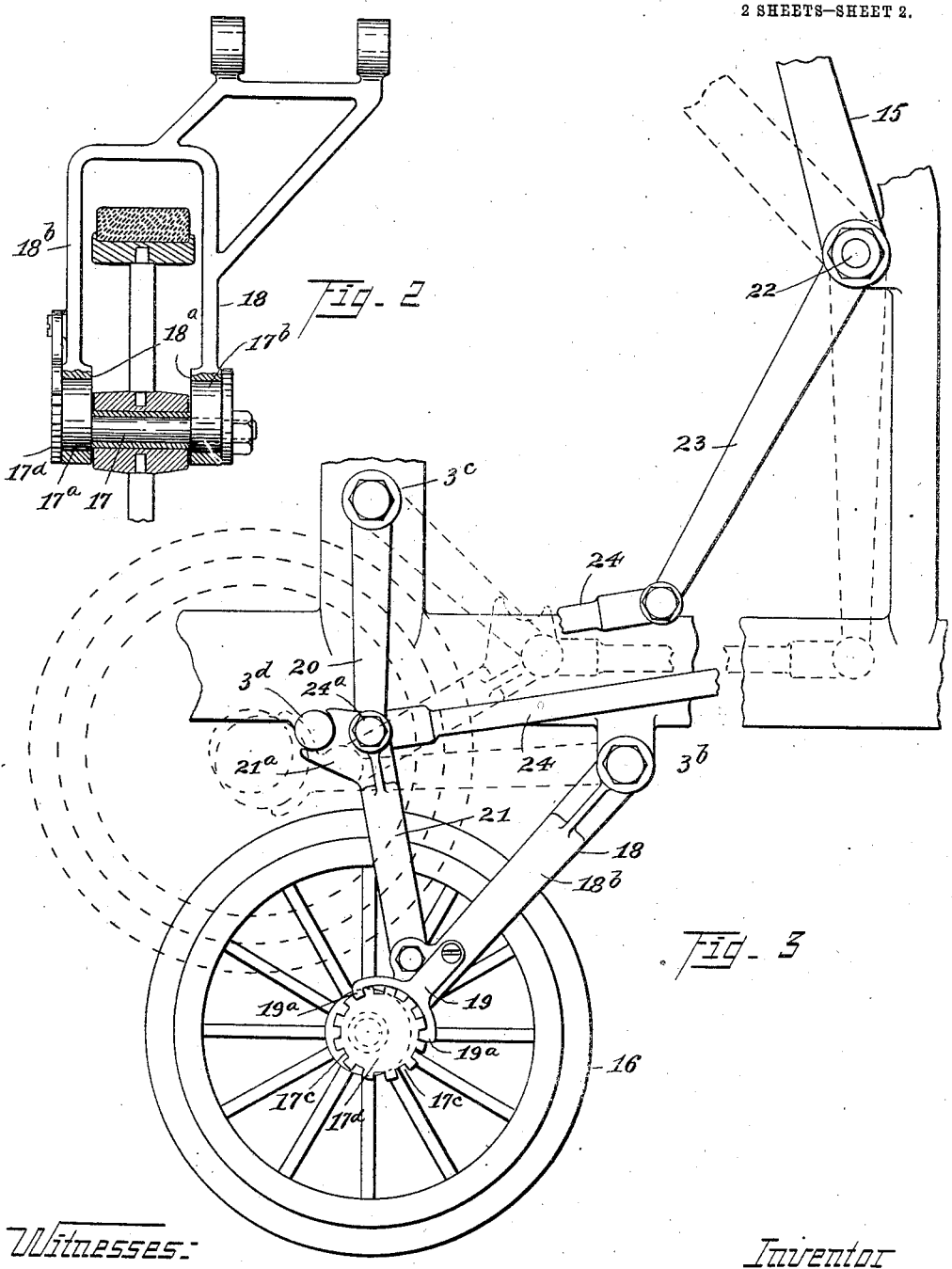
Witnesses:
Inventor
David J. Johnston
by Louis F. Griswold.
his Attorney

UNITED STATES PATENT OFFICE.

DAVID JAMES JOHNSTON, OF TORONTO, ONTARIO, CANADA, ASSIGNOR TO THE MILITAIRE AUTO COMPANY, INC., OF CLEVELAND, OHIO, A CORPORATION OF OHIO.

AUXILIARY-WHEEL MECHANISM FOR MOTOR-CYCLES.

1,091,065.      Specification of Letters Patent.      Patented Mar. 24, 1914.

Application filed January 29, 1913. Serial No. 744,852.

*To all whom it may concern:*

Be it known that I, DAVID JAMES JOHNSTON, a subject of Great Britain, residing at Toronto, in the Province of Ontario and Dominion of Canada, have invented a certain new and useful Auxiliary-Wheel Mechanism for Motor-Cycles, of which the following is a specification.

My invention relates to improvements in motor-cycles, in which an auxiliary wheel, or preferably a pair of wheels are mounted in suitable hangers, pivotally attached to the frame, and are adapted to be raised and lowered by lever and toggle mechanism.

The objects of the invention are to increase the stability of the machine, to facilitate the starting and stopping of the same, to retain it in an upright position when at rest and to act as an aid in the prevention of skidding. These objects combine to produce in a motor-cycle, a high degree of durability, safety and comfort. I attain these objects by the combination and arrangement of the parts shown in the drawings forming a part of this specification, in which—

Figure 1 is a side elevation of the rear portion of a motor-cycle embodying my improvement. Fig. 2 illustrates one of the auxiliary wheel hangers, partially in section to show the axle adjustment. Fig. 3 illustrates the mechanism for raising and lowering the auxiliary wheels.

Similar characters of reference designate similar parts in the drawings and specifications.

As the improvement appertains only to a portion of the vehicle the general construction of the machine will be entered into, only so far as it relates to the improvement.

The auxiliary wheel mechanism which is provided for the purposes mentioned in the preamble, consists of two wheels, each of which is mounted on the vehicle and operated as follows: One hand-lever 15 being sufficient to actuate the operative mechanism of both wheels simultaneously, and as this mechanism is the same for both, the description of one will suffice, therefore the parts will be referred to in the singular. The wheel 16 is mounted on the axle 17, in the yoke or hanger 18. It is preferable for various reasons, to make this mounting adjustable, and I provide for this by forming the axle with two eccentric heads $17^a$ and $17^b$, adapted to fit in eyes $18^a$ in the arms of the hanger 18, and are held in the desired relative position to the axle portion 17 by suitable means. The means shown consists of a spanner 19 attached to the arm $18^b$, and provided with teeth $19^a$ adapted to engage with notches $17^c$ in the periphery of the flange $17^d$.

The hanger 18 is pivotally attached to the side-bar 3 at $3^b$, and is also connected with the frame at $3^c$, by the toggle members 20 and 21. The hand-lever 15 is keyed or otherwise rigidly attached to the shaft 22 which actuates the mechanism on both sides of the vehicle. An arm 23 is also rigidly attached to the shaft 22, and is connected by a link 24 with the toggle members 20 and 21, preferably at their pivotal junction $24^a$. A boss $3^d$ on the side bar 3, acts as a stop to limit the throw of the wheel, by its engagement with the projection $21^a$ of the toggle member 21. In Fig. 3 the two extreme positions of the mechanism are shown. The downward position in full lines and the raised position in broken lines.

By the embodiment of the herein described auxiliary wheel mechanism in the construction of a motor-cycle, the comfort, durability and safety of the vehicle is greatly increased.

Having now described my invention, what I claim and desire to secure by Letters Patent is—

1. In a motor-cycle having a frame, the combination of a pair of auxiliary wheels mounted in hangers pivotally attached to the frame adjacent the rear end thereof, toggle connections between said hangers and the frame, means for actuating said toggles, whereby the wheels are raised and lowered and a stop to govern the throw of the toggle.

2. In a motor-cycle having a frame, the combination of a pair of auxiliary wheels mounted in hangers pivotally attached to the frame adjacent the rear end thereof, toggle connection between said hangers and the frame, a lever and link connection for actuating said toggle to raise and lower the wheels, and a stop to govern the throw of the toggle.

3. In a motor-cycle having a frame, the combination of a pair of auxiliary wheels mounted in hangers pivotally attached to the frame adjacent the rear end thereof, means for adjusting the wheel axles in the hangers, toggle connections between said hangers and the frame, arms mounted on the frame, links connecting said arms with the toggle, a hand lever adapted to coöperate with said arms, links and toggles, whereby the wheels are raised and lowered, and a stop to govern the throw of the toggle.

4. In a motor cycle, the combination with a pair of auxiliary wheels mounted in hangers, of an axle for each of said wheels, bearings for said axles adapted to be rotatably shifted, circumferentially notched flanges on said bearings, spanners secured to said hangers having teeth engaging within said notches, said axle being eccentrically mounted in said bearings, and means for raising and lowering said hanger and wheel.

DAVID JAMES JOHNSTON.

Witnesses:
FRED C. SCHLATTER,
L. F. GRISWOLD.